(12) United States Patent
Lee et al.

(10) Patent No.: US 9,379,390 B2
(45) Date of Patent: *Jun. 28, 2016

(54) PROCESS FOR PRODUCING CATALYST FOR DIRECT-LIQUID FUEL CELL, CATALYST PRODUCED BY THE PROCESS AND USES THEREOF

(75) Inventors: Kunchan Lee, Tokyo (JP); Chunfu Yu, Tokyo (JP); Ryuji Monden, Tokyo (JP); Masaki Horikita, Tokyo (JP); Takashi Sato, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 140 days.

This patent is subject to a terminal disclaimer.

(21) Appl. No.: 14/236,160

(22) PCT Filed: Apr. 5, 2012

(86) PCT No.: PCT/JP2012/059375
§ 371 (c)(1),
(2), (4) Date: Jan. 30, 2014

(87) PCT Pub. No.: WO2013/021681
PCT Pub. Date: Feb. 14, 2013

(65) Prior Publication Data
US 2014/0170527 A1 Jun. 19, 2014

(30) Foreign Application Priority Data
Aug. 9, 2011 (JP) .................. 2011-174053

(51) Int. Cl.
*H01M 4/90* (2006.01)
*H01M 4/88* (2006.01)
(Continued)

(52) U.S. Cl.
CPC *H01M 4/90* (2013.01); *H01M 4/88* (2013.01); *H01M 4/9041* (2013.01);
(Continued)

(58) Field of Classification Search
CPC ....... H01M 4/88; H01M 4/90; H01M 4/9041; H01M 8/1009; B01J 35/0033; B01J 37/086; B01J 27/24; Y02E 60/523
See application file for complete search history.

(56) References Cited

U.S. PATENT DOCUMENTS

| 2004/0058808 A1 | 3/2004 | Lu et al. | |
| 2010/0086823 A1* | 4/2010 | Koshino | H01M 4/9008 429/452 |

(Continued)

FOREIGN PATENT DOCUMENTS

| JP | 7-324093 A | 12/1995 |
| JP | 11-144745 A | 5/1999 |

(Continued)

OTHER PUBLICATIONS

Communication dated Jun. 15, 2015 from the European Patent Office in counterpart application No. 12821438.4.
(Continued)

*Primary Examiner* — Brittany Raymond
(74) *Attorney, Agent, or Firm* — Sughrue Mion, PLLC (57) ABSTRACT

In a direct-liquid fuel cell supplied directly with a liquid fuel, a process for producing an electrode catalyst for a direct-liquid fuel cell is provided which is capable of suppressing decrease in cathode potential caused by liquid fuel crossover and providing an inexpensive and high-performance electrode catalyst for a direct-liquid fuel cell. The process for producing an electrode catalyst for a direct-liquid fuel cell includes Step A of mixing at least a transition metal-containing compound with a nitrogen-containing organic compound to obtain a catalyst precursor composition, and Step C of heat-treating the catalyst precursor composition at a temperature of from 500 to 1100° C. to obtain an electrode catalyst, wherein part or entirety of the transition metal-containing compound includes, as a transition metal element, at least one transition metal element M1 selected from Group IV and Group V elements of the periodic table.

12 Claims, 2 Drawing Sheets

(51) Int. Cl.
   *H01M 8/10*    (2016.01)
   *B01J 37/08*   (2006.01)
   *B01J 27/24*   (2006.01)
   *B01J 35/00*   (2006.01)

(52) U.S. Cl.
   CPC ............. *H01M 8/1009* (2013.01); *B01J 27/24* (2013.01); *B01J 35/0033* (2013.01); *B01J 37/086* (2013.01); *Y02E 60/523* (2013.01); *Y02P 70/56* (2015.11)

(56) References Cited

U.S. PATENT DOCUMENTS

| | | | | |
|---|---|---|---|---|
| 2011/0008709 | A1* | 1/2011 | Shishikura | H01M 4/9016 429/483 |
| 2011/0020729 | A1* | 1/2011 | Monden | H01M 4/90 429/483 |
| 2012/0315568 | A1 | 12/2012 | Lee et al. | |

FOREIGN PATENT DOCUMENTS

| | | | |
|---|---|---|---|
| JP | 2002-184427 | A | 6/2002 |
| JP | 2003-257453 | A | 9/2003 |
| JP | 2003-342058 | A | 12/2003 |
| JP | 2005-135752 | A | 5/2005 |
| JP | 2007-031781 | A | 2/2007 |
| WO | 2007/072665 | A1 | 6/2007 |
| WO | 2008/111570 | A1 | 9/2008 |
| WO | WO 2008-111570 | * | 9/2008 |
| WO | 2009/107518 | A1 | 9/2009 |
| WO | WO 2009-107518 | * | 9/2009 |
| WO | 2009/119523 | A1 | 10/2009 |
| WO | WO 2009-119523 | * | 10/2009 |
| WO | 2011/099493 | A1 | 8/2011 |

OTHER PUBLICATIONS

International Search Report dated Jun. 26, 2012 for International Application No. PCT/JP2012/059375.

Kunchan Lee et al; "Methanol-Tolerant Oxygen Reduction Electrocatalysts Based on Pd-3D Transition Metal Alloys for Direct Methanol Fuel Cells"; Journal of the Electrochemical Society; 2006; vol. 153, No. 1; pp. A20-A24.

Kunchan Lee et al.; "A novel methanol-tolerant Ir-Se chalcogenide electrocatalyst for oxygen reduction"; Journal of Power Sources; vol. 165, issue 1; Feb. 25, 2007; pp. 108-113.

Kunchan Lee et al; "$Ir_xCo_{1-x}$ (x=0.3-1.0) alloy electrocatalysts, catalytic activities, and methanol tolerance in oxygen reduction reaction"; Journal of Power Sources; vol. 170, Issue 2; Jul. 10, 2007; pp. 293-296.

Yan Liu et al; "Transition Metal Oxides as DMFC Cathodes Without Platinum"; Journal of the Electrochemical Society; 2007; vol. 154, No. 7; pp. B664-B669.

Shotaro Doi et al; "Zirconium-Based Compounds for Cathode of Polymer Electrolyte Fuel Cell"; Journal of the Electrochemical Society; 2007; vol. 154; No. 3; pp. B362-B369.

* cited by examiner

PROCESS FOR PRODUCING CATALYST FOR DIRECT-LIQUID FUEL CELL, CATALYST PRODUCED BY THE PROCESS AND USES THEREOF

CROSS REFERENCE TO RELATED APPLICATIONS

This application is a National Stage of International Application No. PCT/JP2012/059375 filed Apr. 5, 2012, claiming priority based on Japanese Patent Application No. 2011-174053 filed Aug. 9, 2011, the contents of all of which are incorporated herein by reference in their entirety.

TECHNICAL FIELD

The present invention relates to a process for producing a catalyst for a direct-liquid fuel cell, a catalyst produced by the process and uses thereof.

BACKGROUND ART

Direct-liquid fuel cells using, as a direct fuel, a liquid fuel such as methanol, ethanol, formic acid, 2-propanol and dimethyl ether have a simplified structure and the fuels are easy to handle. These fuel cells are thus expected to be applied to portable uses, mobile power sources and distributed power sources.

The direct-liquid fuel cells have a structure in which, for example, a polymer electrolyte membrane with proton conductivity is held by an anode (fuel electrode) and a cathode (air electrode). The anode is directly supplied with a liquid fuel, while the cathode is supplied with oxygen, whereby at the anode, the liquid fuel is oxidized and at the cathode, oxygen is reduced, so that electric energy can be collected to the outside.

However, in direct-liquid fuel cells, a problem is that the crossover of liquid fuel decreases potential at the cathode along with decrease in fuel utilization rate, which leads to considerable decrease in energy conversion efficiency of the cells. The liquid fuel crossover refers to a phenomenon where a liquid fuel permeates through a polymer electrolyte membrane and moves from the anode to the cathode. The liquid fuel that has reached the cathode is directly oxidized on the surface of a cathode catalyst, which decreases potential at the cathode.

As a cathode catalyst of the direct-liquid fuel cells, platinum catalysts or platinum alloy catalysts are generally employed. Platinum catalysts or platinum alloy catalysts have high activity and high stability, but exhibit high catalytic activity not just with respect to oxygen reduction reaction but also with respect to the oxidation reaction of the liquid fuels mentioned above, and thus promotes also the oxidation reaction of the liquid fuel that has reached the cathode as a result of its crossover. Consequently, an oxygen reduction potential at the cathode, forming a mixed potential together with a liquid fuel oxidation potential, is considerably decreased.

Direct-liquid fuel cells, in order to promote reaction at the anode and to suppress potential decrease at the cathode caused by fuel crossover, employ more amount of a platinum catalyst than fuel cells using hydrogen. However, since platinum is expensive and limited in its resource amount, the development of alternative electrode catalysts for direct-liquid fuel cells is strongly desired.

In order to suppress liquid fuel crossover in direct-liquid fuel cells, an electrolyte membrane causing less permeation of a liquid fuel or an electrolyte membrane causing no liquid fuel crossover have been developed (for example, see Patent Literatures 1 to 3).

However, in the electrolyte membranes described in Patent Literatures 1 to 3, significantly decreasing liquid fuel crossover while keeping high ion conductivity and stability is extremely difficult. Even if using an electrolyte membrane suppressing liquid fuel permeation to some extent, since liquid fuel is necessarily permeated to no small extent together with water permeation, potential decrease at the cathode cannot be avoided.

On the other hand, catalyst are reported which do not oxidize a liquid fuel that has reached the cathode as a result of its crossover, but selectively perform oxygen reduction only (for example, see Patent Literature 4 and Non-Patent Literatures 1 to 4).

However, the catalysts disclosed in Patent Literature 4 and Non-Patent Literatures 1 to 3 employ expensive noble metals such as palladium and iridium in large amount, and are thus economically disadvantageous. The catalyst disclosed in Non-Patent Literature 4, which does not use a noble metal and is thus inexpensive, does not provide an oxygen reducing ability sufficient as a catalyst for practical purpose.

Thus, the development of more inexpensive and high-performance electrode catalysts for a direct-liquid fuel cell is strongly demanded.

The catalyst disclosed in Patent Literature 5 employs an inexpensive zirconium (Zr)-based oxide; however, the oxygen reducing ability sufficient as a catalyst for practical purpose is not obtained.

Non-Patent Literature 5 reports that zirconium-based $ZrO_xN_y$ compounds exhibit oxygen reducing ability.

Patent Literature 6 discloses, as a platinum-alternative material, an oxygen reducing electrode material containing a nitride of at least one element selected from Group IV, Group V and Group XIV elements of the long periodic table.

However, materials containing any of these non-metals have a problem in terms of their failure to achieve an oxygen reducing ability sufficient as a catalyst for practical purpose.

Patent Literature 7 discloses oxycarbonitrides obtained by mixing a carbide, an oxide and a nitride, and heating the mixture in vacuum, inert or non-oxidizing atmosphere at 500 to 1500° C.

However, the oxycarbonitrides disclosed in Patent Literature 7, which are thin film magnetic head ceramic substrate materials, are not studied from the viewpoint of their use as a catalyst.

Platinum, which is useful not only as a catalyst for the above fuel cell but also as a discharge gas treating catalyst or a catalyst for organic synthesis, is expensive and limited in its resource amount. Thus, the development of alternative catalysts also in these applications is strongly desired.

CITATION LIST

Patent Literature

[Patent Literature 1] JP-A-H11-144745
[Patent Literature 2] JP-A-2002-184427
[Patent Literature 3] JP-A-2003-257453
[Patent Literature 4] JP-A-2005-135752
[Patent Literature 5] WO-A-07-072665
[Patent Literature 6] JP-A-2007-31781
[Patent Literature 7] JP-A-2003-342058

Non-Patent Literature

[Non-Patent Literature 1] K. Lee, O. Savadogo, A. Ishihara, S. Mitsushima, N. Kamiya, K. Ota, "Methanol-Tolerant Oxygen Reduction Electrocatalysts Based on Pd-3d Transition Metal Alloys for Direct Methanol Fuel Cells", Journal of The Electrochemical Society, 2006, 153(1), A20-A24

[Non-Patent Literature 2] K. Lee, L. Zhang, J. Zhang, "A novel methanol-tolerant Ir—Se chalcogenide electrocatalyst for oxygen reduction", Journal of Power Sources, 2007, 165(1), 108-113

[Non-Patent Literature 3] K. Lee, L. Zhang, J. Zhang, "Irx-Col-x (x=0.3-1.0) alloy electrocatalysts, catalytic activities, and methanol tolerance in oxygen reduction reaction", Journal of Power Sources, 2007, 170(10), 291-296

[Non-Patent Literature 4] Y. Liu, A. Ishihara, S. Mitsushima, N. Kamiya, K. Ota, "Transition Metal Oxides as DMFC Cathodes Without Platinum", Journal of The Electrochemical Society, 2007, 154(7), B664-B669

[Non-Patent Literature 5] S. Doi, A. Ishihara, S. Mitsushima, N. kamiya, and K. Ota, "Zirconium-Based compounds for Cathode of Polymer Electrolyte Fuel Cell", Journal of The Electrochemical Society, 2007, 154(3), B362-B369

SUMMARY OF THE INVENTION

Technical Problem

Since platinum catalysts or platinum alloy catalysts are highly likely to promote oxidation reaction of liquid fuels such as methanol, ethanol, formic acid, 2-propanol and dimethyl ether, as described above, suppressing decrease in cathode potential caused by fuel cell crossover is extremely difficult.

An object of the present invention is that in a direct-liquid fuel cell supplied directly with a liquid fuel such as methanol, ethanol, formic acid, 2-propanol and dimethyl ether, a process for producing an electrode catalyst for a direct-liquid fuel cell is provided which is capable of suppressing decrease in cathode potential caused by liquid fuel crossover and providing an inexpensive and high-performance electrode catalyst for a direct-liquid fuel cell.

It is another object of the present invention to provide an electrode catalyst for a direct-liquid fuel cell obtained by the production process of the present invention, and uses thereof.

Technical Solution

The present invention relates to, for example, the following (1) to (22).

(1) A process for producing an electrode catalyst for a direct-liquid fuel cell comprising:

Step A of mixing at least a transition metal-containing compound with a nitrogen-containing organic compound to obtain a catalyst precursor composition, and Step C of heat-treating the catalyst precursor composition at a temperature of from 500 to 1100° C. to obtain an electrode catalyst, wherein part or entirety of the transition metal-containing compound comprises, as a transition metal element, at least one transition metal element M1 selected from Group IV and Group V elements of the periodic table.

(2) The process for producing an electrode catalyst for a direct-liquid fuel cell according to (1), wherein in Step A, the mixing is performed in a solvent.

(3) The process for producing an electrode catalyst for a direct-liquid fuel cell according to (2), which comprises, between Step A and Step C, Step B of removing the solvent from the catalyst precursor composition.

(4) The process for producing an electrode catalyst for a direct-liquid fuel cell according to any one of (1) to (3), wherein the transition metal element M1 comprises at least one selected from titanium, zirconium, niobium and tantalum.

(5) The process for producing an electrode catalyst for a direct-liquid fuel cell according to any one of (1) to (4), wherein in Step A, a solution of the transition metal-containing compound is mixed with a solution of the nitrogen-containing organic compound.

(6) The process for producing an electrode catalyst for a direct-liquid fuel cell according to any one of (1) to (5), wherein the nitrogen-containing organic compound is a compound capable of forming a chelate together with a transition metal in the transition metal-containing compound.

(7) The process for producing an electrode catalyst for a direct-liquid fuel cell according to any one of (1) to (6), wherein in Step A, a compound having a diketone structure is further mixed.

(8) The process for producing an electrode catalyst for a direct-liquid fuel cell according to any one of (1) to (7), wherein the transition metal-containing compound partly comprises, as a transition metal element, at least one transition metal element M2 selected from iron, nickel, chromium, cobalt, vanadium and manganese.

(9) The process for producing an electrode catalyst for a direct-liquid fuel cell according to any one of (1) to (8), wherein the transition metal-containing compound is at least selected from the group consisting of metal nitrates, metal acid chlorides, metal-containing organic compounds, metal halides, metal perchlorates and metal hypochlorites.

(10) The process for producing an electrode catalyst for a direct-liquid fuel cell according to any one of (2) to (9), wherein at least one of the transition metal-containing compound and the nitrogen-containing organic compound and the solvent comprises oxygen in the molecule.

(11) The process for producing an electrode catalyst for a direct-liquid fuel cell according to (10), wherein the nitrogen-containing organic compound comprises a carbonyl group.

(12) The process for producing an electrode catalyst for a direct-liquid fuel cell according to (11), wherein to an α-carbon of the carbonyl group, a nitrogen atom is bonded.

(13) The process for producing an electrode catalyst for a direct-liquid fuel cell according to any one of (1) to (12), wherein in Step C, the catalyst precursor composition is heat-treated in an atmosphere containing 0.01 to 10 vol % of a hydrogen gas.

(14) The process for producing an electrode catalyst for a direct-liquid fuel cell according to any one of (1) to (13), wherein Step C is a step in which the catalyst precursor composition is heat-treated at a temperature of from 500 to 1100° C. and the obtained heat-treated product is disintegrated to obtain an electrode catalyst.

(15) An electrode catalyst for a direct-liquid fuel cell obtained by the production process according to any one of (1) to (14), wherein the proportion of atomic numbers of the transition metal element, carbon, nitrogen and oxygen, which constitute the catalyst, (transition metal element:carbon:nitrogen:oxygen) is 1:x:y:z wherein $0<x\leq 7$, $0<y\leq 2$ and $0<z\leq 3$.

(16) An electrode catalyst for a direct-liquid fuel cell obtained by the production process according to (8), wherein the proportion of atomic numbers of the transition metal element M1, the transition metal element M2, carbon, nitrogen and oxygen, which constitute the catalyst, (transition metal element M1:transition metal element M2:carbon:nitrogen:oxygen) is $(1-a):a:x:y:z$ wherein $0<a\leq 0.5$, $0<x\leq 7$, $0<y\leq 2$ and $0<z\leq 3$.

(17) A catalyst layer for a direct-liquid fuel cell comprising the catalyst for a direct-liquid fuel cell according to (15) or (16).

(18) The catalyst layer for a direct-liquid fuel cell according to (17), which further comprises an electron conductive material.

(19) An electrode for a direct-liquid fuel cell, comprising a catalyst layer for a direct-liquid fuel cell and a porous support layer, wherein the catalyst layer for a fuel cell is the catalyst layer for a direct-liquid fuel cell according to (17) or (18).

(20) A membrane-electrode assembly for a direct-liquid fuel cell comprising a cathode, an anode and an electrolyte membrane interposed between the cathode and the anode, wherein the cathode and/or the anode is the electrode for a direct-liquid fuel cell according to (19).

(21) A direct-liquid fuel cell comprising the membrane-electrode assembly for a direct-liquid fuel cell according to (20).

(22) A portable device, an automobile or a stationary fuel cell apparatus, comprising the direct-liquid fuel cell according to (21).

Effects of the Invention

By applying an electrode catalyst for a direct-liquid fuel cell obtained by the production process of the present invention to a direct-liquid fuel cell, the resultant direct-liquid fuel cell can suppress decrease in cathode potential caused by the crossover of fuel cells such as methanol, ethanol, formic acid, 2-propanol and dimethyl ether, and is inexpensive and provides high performance.

DESCRIPTION OF EMBODIMENTS

[Process for Producing Electrode Catalyst for Direct-Liquid Fuel Cell]

The process for producing an electrode catalyst for a direct-liquid fuel cell of the present invention comprises Step A of mixing at least a transition metal-containing compound with a nitrogen-containing organic compound to obtain a catalyst precursor composition, and Step C of heat-treating the catalyst precursor composition at a temperature of from 500 to 1100° C. to obtain an electrode catalyst, wherein part or entirety of the transition metal-containing compound comprises, as a transition metal element, at least one transition metal element M1 selected from Group IV and Group V elements of the periodic table. In the specification of the present invention, an atom and an ion are not strictly distinguished from each other unless special circumstance requires otherwise, and are referred to as an "atom".

(Step A)

In Step A, at least a transition metal-containing compound is mixed with a nitrogen-containing organic compound to obtain a catalyst precursor composition. The mixing is preferably performed in a solvent. Mixing in a solvent is preferable, since doing so makes it possible to uniformly mix the transition metal-containing compound with the nitrogen-containing organic compound.

Exemplary Mixing Procedures are:

procedure (i): preparing a solvent in one container, adding thereto the transition metal-containing compound and the nitrogen-containing organic compound, and mixing them; and procedure (ii): preparing a solution of the transition metal-containing compound and a solution of the nitrogen-containing organic compound, and mixing the solutions.

When a solvent does not allow each component to have high solubility therein, the procedure (ii) is preferable. When the transition metal-containing compound is, for example, a metal halide described later, the procedure (i) is preferable. When the transition metal-containing compound is, for example, a metal-containing organic compound or a metal complex described later, the procedure (ii) is preferable.

When the first transition metal-containing compound and the second transition metal-containing compound described later are used as the transition metal-containing compound, a preferable procedure in the procedure (ii) is, for example:

procedure (ii'): preparing a solution of the first transition metal-containing compound, and a solution of the second transition metal-containing compound and the nitrogen-containing organic compound, and mixing the solutions.

The catalyst precursor composition is considered to contain a reaction product between the transition metal-containing compound and the nitrogen-containing organic compound. The solubility of this reaction product in a solvent differs depending on the combination of the transition metal-containing compound, the nitrogen-containing organic compound and a solvent, and the like.

In Step A, the transition metal-containing compound, the nitrogen-containing organic compound and a solvent may be introduced into a pressure-applicable container such as an autoclave, and mixed with each other at a pressure more than ordinary pressure.

<Transition Metal-Containing Compound>

Part or entirety of the transition metal-containing compound comprises, as a transition metal element, at least one transition metal element M1 selected from Group IV and Group V elements of the periodic table. Examples of the transition metal element M1 specifically include titanium, zirconium, hafnium, vanadium, niobium and tantalum. These may be used singly, or two or more kinds thereof may be used in combination.

Of the transition metal elements M1, in terms of cost and performance of the resultant catalyst, titanium, zirconium, niobium and tantalum are preferable, and titanium and zirconium are still more preferable.

The transition metal-containing compound preferably contains at least one selected from an oxygen atom and a halogen atom. Examples of the transition metal-containing compound include metal phosphates, metal sulfates, metal nitrates, metal acid halides (intermediate hydrolysates of metal halides), metal halides, metal halates, metal hypohalites, metal-containing organic compounds and metal complexes. Metal nitrates, metal acid chlorides, metal-containing organic compounds, metal halides, metal perchlorates and metal hypochlorites are preferable. These may be used singly, or two or more kinds thereof may be used in combination. Examples of the metal-containing organic compound include metal organic acid salts and metal alkoxides.

The metal alkoxides are preferably methoxide, propoxide, isopropoxide, ethoxide, butoxide, and isobutoxide of the transition metals; further preferably isopropoxide, ethoxide, and butoxide of the transition metals. The metal alkoxide may have one kind of alkoxy group, or may have two or more kinds of alkoxy groups.

The transition metal-containing compounds having an oxygen atom are preferably alkoxides, acetylacetone complexes, acid chlorides and sulfates. In terms of cost, alkoxides and acetylacetone complexes are more preferable. In terms of solubility in liquid phase in a solvent, alkoxides and acetylacetone complexes are still more preferable.

The metal halides are preferably chlorides, bromides and iodides of the transition metals. The metal acid halides are preferably acid chlorides, acid bromides and acid iodides of the transition metals.

The metal perhalates are preferably metal perchlorates. The metal hypohalites are preferably metal hypochlorites.

Specific examples of the transition metal-containing compounds include:

titanium compounds such as titanium tetramethoxide, titanium tetraethoxide, titanium tetrapropoxide, titanium tetraisopropoxide, titanium tetrabutoxide, titanium tetraisobutoxide, titanium tetrapentoxide, titanium tetraacetylacetonate, titanium oxydiacetylacetonate, tris(acetylacetonate)titanium (II) chloride ($[Ti(acac)_3]_2[TiCl_6]$), titanium tetrachloride, titanium trichloride, titanium oxychloride, titanium tetrabromide, titanium tribromide, titanium oxybromide, titanium tetraiodide, titanium triiodide and titanium oxyiodide;

niobium compounds such as niobium pentamethoxide, niobium pentaethoxide, niobium pentaisopropoxide, niobium pentabutoxide, niobium pentapentoxide, niobium pentachloride, niobium oxychloride, niobium pentabromide, niobium oxybromide, niobium pentaiodide and niobium oxyiodide;

zirconium compounds such as zirconium tetramethoxide, zirconium tetraethoxide, zirconium tetrapropoxide, zirconium tetraisopropoxide, zirconium tetrabutoxide, zirconium tetraisobutoxide, zirconium tetrapentoxide, zirconium tetraacetylacetonate, zirconium tetrachloride, zirconium oxychloride, zirconium tetrabromide, zirconium oxybromide, zirconium tetraiodide and zirconium oxyiodide;

tantalum compounds such as tantalum pentamethoxide, tantalum pentaethoxide, tantalum pentaisopropoxide, tantalum pentabutoxide, tantalum pentapentoxide, tantalum tetraethoxyacetylacetonate, tantalum pentachloride, tantalum oxychloride, tantalum pentabromide, tantalum oxybromide, tantalum pentaiodide and tantalum oxyiodide;

hafnium compounds such as hafnium tetramethoxide, hafnium tetraethoxide, hafnium tetrapropoxide, hafnium tetraisopropoxide, hafnium tetrabutoxide, hafnium tetraisobutoxide, hafnium tetrapentoxide, hafnium tetraacetylacetonate, hafnium tetrachloride, hafnium oxychloride, hafnium bromide, hafnium oxybromide, hafnium iodide and hafnium oxyiodide; and vanadium compounds such as vanadium oxytrimethoxide, vanadium oxytriethoxide, vanadium oxytriisopropoxide, vanadium oxytributoxide, vanadium(III) acetylacetonate, vanadium(IV) acetylacetonate, vanadium pentachloride, vanadium oxychloride, vanadium pentabromide, vanadium oxybromide, vanadium pentaiodide and vanadium oxyiodide.

These may be used singly, or two or more kinds thereof may be used in combination.

Of these compounds, in view of allowing the resultant catalyst to be fine particles having a uniform particle diameter and to have high activity, preferred are:

titanium tetraethoxide, titanium tetrachloride, titanium oxychloride, titanium tetraisopropoxide, titanium tetraacetylacetonate, niobium pentaethoxide, niobium pentachloride, niobium oxychloride, niobium pentaisopropoxide, zirconium tetraethoxide, zirconium tetrachloride, zirconium oxychloride, zirconium tetraisopropoxide, zirconium tetraacetylacetonate, tantalum pentamethoxide, tantalum pentaethoxide, tantalum pentachloride, tantalum oxychloride, tantalum pentaisopropoxide, tantalum tetraethoxyacetylacetonate.

Further Preferred are:

titanium tetraisopropoxide, titanium tetraacetylacetonate, niobium ethoxide, niobium isopropoxide, zirconium oxychloride, zirconium tetraisopropoxide, and tantalum pentaisopropoxide.

As the transition metal-containing compound, the transition metal-containing compound containing, as a transition metal element, the transition metal element M1 of Group IV or Group V of the periodic table (hereinafter also referred to as the "first transition metal-containing compound") may be used in combination with a transition metal-containing compound containing, as a transition metal element, a transition metal element M2 differing from the transition metal element M1 and being at least one element selected from iron, nickel, chromium, cobalt, vanadium and manganese (hereinafter also referred to as the "second transition metal-containing compound"). The use of the second transition metal-containing compound improves the performance of the resultant catalyst.

The transition metal element M2 in the second transition metal-containing compound is, in terms of the balance between cost and the performance of the resultant catalyst, preferably iron and chromium, still more preferably iron.

Specific examples of the second transition metal-containing compound include:

iron compounds such as iron(II) chloride, iron(III) chloride, iron(III) sulfate, iron(II) sulfide, iron(III) sulfide, potassium ferrocyanide, potassium ferricyanide, ammonium ferrocyanide, ammonium ferricyanide, iron ferrocyanide, iron(II) nitrate, iron(III) nitrate, iron(II) oxalate, iron(III) oxalate, iron(II) phosphate, iron(III) phosphate ferrocene, iron(II) hydroxide, iron(III) hydroxide, iron(II) oxide, iron(III) oxide, triiron tetraoxide, iron(II) acetate, iron(II) lactate, and iron(III) citrate;

nickel compounds such as nickel(II) chloride, nickel(II) sulfate, nickel(II) sulfide, nickel(II) nitrate, nickel(II) oxalate, nickel(II) phosphate, nickelocene, nickel(II) hydroxide, nickel(II) oxide, nickel(II) acetate, and nickel(II) lactate;

chromium compounds such as chromium(II) chloride, chromium(III) chloride, chromium(III) sulfate, chromium(III) sulfide, chromium(III) nitrate, chromium(III) oxalate, chromium(III) phosphate, chromium(III) hydroxide, chromium(II) oxide, chromium(III) oxide, chromium(IV) oxide, chromium(VI) oxide, chromium(II) acetate, chromium(III) acetate, and chromium(III) lactate;

cobalt compounds such as cobalt(II) chloride, cobalt(III) chloride, cobalt(II) sulfate, cobalt(II) sulfide, cobalt(II) nitrate, cobalt(III) nitrate, cobalt(II) oxalate, cobalt(II) phosphate, cobaltcene, cobalt(II) hydroxide, cobalt(II) oxide, cobalt(III) oxide, tricobalt tetraoxide, cobalt(II) acetate, and cobalt(II) lactate;

vanadium compounds such as vanadium(II) chloride, vanadium(III) chloride, vanadium(IV) chloride, vanadium(IV) oxysulfate, vanadium(III) sulfide, vanadium(IV) oxyoxalate, vanadium metallocene, vanadium(V) oxide, vanadium acetate, and vanadium citrate; and manganese compounds such as manganese(II) chloride, manganese(II) sulfate, manganese(II) sulfide, manganese(II) nitrate, manganese(II) oxalate, manganese(II) hydroxide, manganese(II) oxide, manganese(III) oxide, manganese(II) acetate, manganese(II) lactate, and manganese citrate.

These may be used singly, or two or more kinds thereof may be used in combination.

Of these compounds, preferred are:

iron(II) chloride, iron(III) chloride, potassium ferrocyanide, potassium ferricyanide, ammonium ferrocyanide, ammonium ferricyanide, iron(II) acetate, iron(II) lactate;

nickel(II) chloride, nickel(II) acetate, nickel(II) lactate;

chromium(II) chloride, chromium(III) chloride, chromium (II) acetate, chromium(III) acetate, chromium(III) lactate;

cobalt(II) chloride, cobalt(III) chloride, cobalt(II) acetate, cobalt(II) lactate;

vanadium(II) chloride, vanadium(III) chloride, vanadium (IV) chloride, vanadium(IV) oxysulfate, vanadium acetate, vanadium citrate;

manganese(II) chloride, manganese(II) acetate, and manganese(II) lactate.

Further Preferred are:

iron(II) chloride, iron(III) chloride, potassium ferrocyanide, potassium ferricyanide, ammonium ferrocyanide, ammonium ferricyanide, iron(II) acetate, iron(II) lactate, chromium(II) chloride, chromium(III) chloride, chromium (II) acetate, chromium(III) acetate, and chromium(III) lactate.

<Nitrogen-Containing Organic Compound>

The nitrogen-containing organic compound, which is not particularly limited, is preferably a compound capable of becoming a ligand that can be coordinated to a metal atom in the transition-metal containing metal compound (preferably, a compound capable of forming a mononuclear complex); further preferably a compound capable of becoming a multidentate ligand (preferably, a bidentate ligand or a tridentate ligand) (compound capable of forming a chelate).

The nitrogen-containing organic compounds may be used singly, or two or more kinds thereof may be used in combination.

The nitrogen-containing organic compounds used in the present invention are preferably those having a carbonyl group. The carbonyl group may be contained as part of a functional group in the nitrogen-containing organic compound. It is preferable the carbonyl group is contained as part of a carboxyl group or part of an aldehyde group in the nitrogen-containing organic compound, and it is preferable that the carbonyl group is contained as a carboxyl group in the nitrogen-containing organic compound. At least one carbonyl group may be contained in the molecule of the nitrogen-containing organic compound, or multiple carbonyl groups may be contained therein.

When the nitrogen-containing organic compound has a carbonyl group, by the mixing in Step A, such a nitrogen-containing organic compound is considered to be more strongly coordinated to a transition metal of the transition metal-containing compound. The nitrogen-containing organic compounds may be used singly, or two or more kinds thereof may be used in combination.

The nitrogen-containing organic compound is preferably a compound in which a nitrogen atom is bonded to an α-carbon of a carbonyl group, in terms of the activity of the resultant electrode catalyst.

Examples of the nitrogen-containing organic compound include amino acids and amino acid derivatives.

The amino acids are preferably alanine, arginine, asparagine, asparaginic acid, cysteine, glutamine, glutamic acid, glycine, histidine, isoleucine, leucine, lysine, methionine, phenylalanine, serine, threonine, tryptophan, tyrosine, valine, norvaline, and aminoacetic acid.

The amino acid derivatives are preferably oligopeptides such as glycylglycine, triglycine and tetraglycine, pyroglutamic acid and α-amino fatty acid derivatives.

In terms of providing a catalyst having a high activity, alanine, glycine, lysine, methionine, and tyrosine are more preferable. In terms of providing a catalyst having an extremely high activity, alanine, glycine and lysine are particularly preferable.

In addition to the above amino acids and the amino acid derivatives, pyrrole-2-carboxylic acid, imidazole-2-carboxylic acid, pyrazinecarboxylic acid, piperidine-2-carboxylic acid, piperazine-2-carboxylic acid, pyrimidine-2-carboxylic acid, pyrimidine-4-carboxylic acid, 2-pyridinecarboxylic acid, 2,4-pyridinedicarboxylic acid, 2-quinolinecarboxylic acid and oxamic acid are preferable.

The ratio (B/A) of the total atomic number B of carbon of the nitrogen-containing organic compound used in Step A to the total atomic number A of transition metal element of the transition metal-containing metal compound used in Step A is preferably 200 or less, more preferably 150 or less, further preferably 80 or less, particularly preferably 30 or less in terms of allowing the heat treatment in Step C to be performed while decreasing components eliminating as carbon compounds such as carbon dioxide and carbon monoxide, i.e., decreasing an emission gas during catalyst production; and the ratio is preferably 1 or more, more preferably 2 or more, further preferably 3 or more, particularly preferably 5 or more in terms of obtaining a catalyst having good activity.

The ratio (C/A) of the total atomic number C of nitrogen of the nitrogen-containing organic compound used in Step A to the total atomic number A of transition metal element of the transition metal-containing compound used in Step A is preferably 28 or less, more preferably 17 or less, further preferably 12 or less, particularly preferably 8.5 or less in terms of obtaining a catalyst having good activity; and the ratio is preferably 1 or more, more preferably 2.5 or more, further preferably 3 or more, particularly preferably 3.5 or more in terms of obtaining a catalyst having good activity.

When the first transition metal-containing compound and the second transition metal organic compound are used as the transition metal-containing compound, the ratio of the first transition metal-containing compound used in Step A to the second transition metal-containing compound used in Step A, in terms of the molar ratio (M1:M2) of the transition metal element M1 atom to the transition metal element M2 atom, is M1:M2=(1-a):a, wherein the range of a is usually $0<a\leq0.5$, preferably $0.01<a\leq0.5$, more preferably $0.02\leq a\leq0.4$, particularly preferably $0.05\leq a\leq0.3$.

<Solvent>

Examples of the solvent include water, alcohols and acids. The alcohols are preferably ethanol, methanol, butanol, propanol and ethoxy ethanol, still more preferably ethanol and methanol. The acids are preferably acetic acid, nitric acid (aqueous solution), hydrochloric acid, aqueous phosphoric acid solution and aqueous citric acid solution. Acetic acid and nitric acid are still more preferable. These may be used singly, or two or more kinds thereof may be used in combination.

In Step A, it is preferable that a compound having a diketone structure is further mixed. The use of the compound having a diketone structure is preferable, since by doing so, the transition metal-containing compound is formed into a metal complex, and can form a uniform mixture together with the nitrogen-containing compound.

The compound having a diketone structure is preferably diacetyl, acetylacetone, 2,5-hexanedione and dimedone, more preferably acetylacetone and 2,5-hexanedione. The compounds having a diketone structure may be used singly, or two or more kinds thereof may be used in combination.

It is preferable that at least one of the transition metal-containing compound, the nitrogen-containing organic compound and the solvent that are used in the present invention contains oxygen in the molecule, in terms of the activity of the resultant catalyst.

(Step B)

When the mixing is performed using a solvent in Step A, Step B is usually performed. In Step B, from the catalyst precursor composition obtained in Step A, the solvent is removed.

The solvent removal may be performed in air, or may be performed under an atmosphere of an inert gas (for example, nitrogen, argon, and helium). From the viewpoint of cost, the inert gas is preferably nitrogen and argon; more preferably nitrogen.

The temperature in the solvent removal may be room temperature when the vapor pressure of a solvent is large. However, from the viewpoint of mass production of the catalyst, the temperature in the solvent removal is preferably 30° C. or higher, more preferably 40° C. or higher, further preferably 50° C. or higher. From the viewpoint of preventing the decomposition of the catalyst precursor presumed to be a metal complex, such as a chelate, contained in the solution obtained in Step A, the temperature in the solvent removal is preferably 250° C. or lower, more preferably 150° C. or lower, further preferably 110° C. or lower.

The solvent removal may be performed under atmospheric pressure when the vapor pressure of a solvent is high, but may be performed under reduced pressure (e.g., 0.1 Pa to 0.1 MPa) in order to remove the solvent within a shorter period of time. For the solvent removal under reduced pressure, for example, an evaporator can be used.

In the process for producing an electrode catalyst for a direct-liquid fuel cell of the present invention, Step A, without subsequently performing Step B, may be followed by Step C. However, when the mixing is performed in a solvent in Step A, it is preferred that the solvent is removed by performing Step B and thereafter Step C is performed. Performing Step B is preferable because of improving energy efficiency in Step C.

(Step C)

In Step C, the catalyst precursor composition is heat-treated to obtain an electrode catalyst.

The temperature in this heat treatment is 500 to 1100° C., preferably 600 to 1050° C., more preferably 700 to 950° C.

If the temperature in this heat treatment is excessively higher than the above range, sintering and grain growth occur between particles of the resultant electrode catalyst, consequently decreasing the specific surface area of the electrode catalyst, and therefore poor processability is caused when the particles are processed to a catalyst layer by a coating method. On the other hand, if the temperature in this heat treatment is excessively lower than the above range, an electrode catalyst having high activity cannot be obtained.

Examples of the heat treatment include standing method, stirring method, dropping method and powder capturing method. Exemplary shapes of a furnace in the heat treatment include a tubular furnace, a top-loading furnace, a tunnel furnace, a box furnace, a sample table elevating-type furnace (elevator furnace) and a car-bottom furnace. Of these, particularly preferred are a tubular furnace, a top-loading furnace, a box furnace, and a sample table elevating-type furnace, which allow for the strict controlling of atmosphere; and preferred are a tubular furnace and a box furnace.

The atmosphere in performing the heat treatment is preferably an atmosphere containing an inert gas as a main component, which provides an electrode catalyst having increased activity. Among the inert gases, in view of relative inexpensiveness and easy availability, nitrogen, argon, and helium are preferred; and nitrogen and argon are further preferred. These inert gases may be used singly or in combination of two or more kinds. Although these gases are commonly recognized as being inert, there is a possibility that in the heat treatment of Step C, these inert gases, i.e., nitrogen, argon, helium, and the like are reacted with the catalyst precursor composition.

When the heat treatment is performed under the atmosphere of a nitrogen gas; an argon gas; a mixed gas of a nitrogen gas and an argon gas; or a mixed gas of at least one gas selected from a nitrogen gas and an argon gas and at least one gas selected from a hydrogen gas, an ammonia gas and an oxygen gas, an electrode catalyst having high catalytic performance tends to be obtained.

When the atmosphere in performing the heat treatment contains a hydrogen gas, the concentration of the hydrogen gas is, for example, 100% by volume or less, preferably 0.01 to 10% by volume, more preferably 1 to 5% by volume.

When the atmosphere of the heat treatment contains an oxygen gas, the concentration of the oxygen gas is, for example, 0.01 to 10 vol %, preferably 0.01 to 5 vol %.

A heat-treated product obtained by the heat treatment may be used as it is for an electrode catalyst, or may be disintegrated before used as an electrode catalyst. In the specification of the present invention, operations such as disintegrating and crushing performed in order to pulverize the heat-treated product are referred to as the "disintegrating" without particular distinction. Performing the disintegrating may improve the processability in using the resultant electrode catalyst to produce an electrode, and the properties of the resultant electrode. For the disintegrating, for example, a roll-rotating mill, a ball mill, a small-diameter ball mill (bead mill), a medium-stirring mill, an air flow crusher, a mortar, an automatic kneading mortar, a crushing tank, or a jet mill is employable. For a small amount of the electrode catalyst, a mortar, an automatic kneading mortar, or a batch-type ball mill is preferably used. When a large amount of the electrode catalyst is continuously treated, a jet mill and continuous ball mills are preferred. Among the continuous ball mills, a bead mill is preferred.

When the heat-treated product is disintegrated in a wet process, a dispersion medium is usually used.

Preferred examples of the dispersion medium include:

alcohols such as methanol, ethanol, 1-propanol, 2-propanol, 1-butanol, 2-butanol, isobutyl alcohol, tert-butyl alcohol, pentanol, 2-heptanol and benzyl alcohol;

ketones such as acetone, methyl ethyl ketone, methyl propyl ketone, methyl butyl ketone, methyl isobutyl ketone, methyl amyl ketone, acetonyl acetone, diethyl ketone, dipropyl ketone and diisobutyl ketone;

ethers such as tetrahydrofuran, diethylene glycol dimethyl ether, anisole, methoxytoluene, diethylether, dipropyl ether and dibutyl ether;

amines such as isopropyl amine, butyl amine, isobutyl amine, cyclohexylamine and diethylamine;

esters such as propyl formate, isobutyl formate, amyl formate, methyl acetate, ethyl acetate, propyl acetate, butyl acetate, isobutyl acetate, pentyl acetate and isopentyl acetate; and polar solvents such as acetonitrile, dimethylformamide, dimethylacetoamide, N-methylpyrrolidone, ethylene glycol, diethylene glycol and propylene glycol.

These may be used singly, or two or more kinds thereof may be used in combination.

It is preferable that the dispersion medium does not contain substantially water. Specifically, the content of water in the dispersion medium is preferably 0 to 0.1% by mass.

[Electrode Catalyst for Direct-Liquid Fuel Cell]

The electrode catalyst for a direct-liquid fuel cell of the present invention is produced by the above-mentioned process for producing an electrode catalyst for a direct-liquid fuel cell of the present invention (hereinafter, an electrode catalyst for a direct-liquid fuel cell produced by the above-mentioned process for producing an electrode catalyst for a direct-liquid fuel cell of the present invention is referred to as the "catalyst").

The proportion of the atomic numbers of the transition metal element (the transition metal element M1 is not distinguished from the transition metal element M2), carbon, nitrogen and oxygen, which constitute the catalyst, is the transition metal element:carbon:nitrogen:oxygen=1:x:y:z wherein $0 < x \le 7$, $0 < y \le 2$ and $0 < z \le 3$ are preferably fulfilled.

In terms of providing an electrode catalyst having a high activity, the range of x is more preferably $0.15 \le x \le 5.0$, still more preferably $0.2 \le x \le 4.0$, particularly preferably $1.0 \le x \le 3.0$; the range of y is more preferably $0.01 \le y \le 1.5$, still more preferably $0.02 \le y \le 0.5$, particularly preferably $0.03 \le y \le 0.4$; and the range of z is more preferably $0.6 \le z \le 2.6$, more preferably $0.9 \le z \le 2.0$, particularly preferably $1.3 \le z \le 1.9$.

When the catalyst contains, as the transition metal element, one transition metal element M1 selected from the group consisting of Group IV and Group V elements of the periodic table, and at least one transition metal element M2 selected from iron, nickel, chromium, cobalt, vanadium and manganese, the proportion of the atomic numbers of the transition metal element M1, the transition metal element M2, carbon, nitrogen and oxygen, which constitute the catalyst, is the transition metal element M1:the transition metal element M2:carbon:nitrogen:oxygen=(1-a):a:x:y:z wherein $0 < a \le 0.5$, $0 < x \le 7$, $0 < y \le 2$ and $0 < z \le 3$ are preferably fulfilled. The catalyst, when containing M2 in this way, provides higher performance.

In terms of providing an electrode catalyst having a high activity, preferable ranges of x, y and z are as described above. The range of a is more preferably $0.1 \le a \le 0.5$, still more preferably $0.02 \le a \le 0.4$, particularly preferably $0.05 \le a \le 0.3$.

The values a, x, y and z are values measured by the method adopted in Examples described later.

When the transition metal element M2 (a metal element differing from M1 and being at least one metal element selected from iron, nickel, chromium, cobalt, vanadium and manganese) is present, the following possibilities (1) to (3) are presumed.

(1) In the synthesis of the electrode catalyst, the transition metal element M2 or a compound containing the transition metal element M2 functions as a catalyst for forming a bond between the transition metal element M1 atom and a nitrogen atom.

(2) The transition metal element M2 or a compound containing the transition metal element M2 prevents a heat-treated product from sintering in the heat treatment of Step C, i.e., prevents the decrease in specific surface area.

(3) As a result of the presence of the transition metal element M1 and the transition metal element M2 in the electrode catalyst, at a portion where metal element atoms of these two components are adjacent to each other, charge deviation takes place, involving the adsorption or reaction of a matrix or the elimination of a product which would not be achieved in electrode catalysts containing the transition metal element M1 alone as a metal element.

The catalyst of the present invention preferably has each atom of the transition metal element, carbon, nitrogen and oxygen, and has a crystalline structure of an oxide, a carbide or a nitride of the transition metal element, or multiple crystalline structures of these. The results of the study of the crystalline structures by X-ray diffraction analysis and the elemental analysis of the catalyst lead to the presumption that the catalyst has an oxide structure of the transition metal element with the site of the oxygen atom of the oxide structure being substituted with a carbon atom or a nitrogen atom; or has a carbide, nitride or carbonitride structure of the transition metal element with the site of the carbon atom or the nitrogen atom being substituted with an oxygen atom; or has a mixture containing these structures.

<BET Specific Surface Area>

According to the process for producing an electrode catalyst for a direct-liquid fuel cell of the present invention, an electrode catalyst for a direct-liquid fuel cell having a large specific surface area is produced. The specific surface area as calculated by BET method of the catalyst of the present invention is preferably 30 to 350 m$^2$/g, more preferably 50 to 300 m$^2$/g, still more preferably 100 to 300 m$^2$/g.

<Uses>

The catalyst of the present invention can be effectively used as a catalyst in direct-liquid fuel cells, and can be particularly effectively used as a catalyst alternative to platinum catalysts in direct-liquid fuel cells.

The catalyst of the present invention is particularly effective as an oxygen reducing catalyst in a direct-liquid fuel cell using a liquid fuel such as methanol, ethanol and formic acid.

Applying a platinum catalyst as a cathode catalyst in a direct-liquid fuel cell would decrease cathode potential caused by liquid fuel crossover, and considerably lower the performance of the direct-liquid fuel cell.

However, the catalyst of the present invention in its application for a cathode catalyst in a direct-liquid fuel cell, even if the cathode includes a liquid fuel as a result of its crossover, can suppress decrease in cathode potential, and is excellent in oxygen reducing ability, and is also inexpensive.

The catalyst layer for a direct-liquid fuel cell of the present invention comprises the above catalyst.

Catalyst layers for a direct-liquid fuel cell include an anode catalyst layer and a cathode catalyst layer. In particular, since the above catalyst has a large oxygen reducing ability and can suppress decrease in cathode potential caused by liquid fuel crossover, it is preferably used for a cathode catalyst layer.

Preferably, the catalyst layer for a direct-liquid fuel cell of the present invention further comprises an electron conductive material. The inclusion of the electron conductive material in the catalyst layer for a direct-liquid fuel cell comprising the above catalyst can further increase reduction current. The electron conductive material increases reduction current presumably because of allowing the above catalyst to have an electrical bond for inducing electrochemical reaction.

The electron conductive material is preferably a particulate material (hereinafter referred to as the "electron conductive particles").

The electron conductive particles are usually used as a carrier of the catalyst. Examples of materials constituting the electron conductive particles include carbon, conductive polymers, conductive ceramics, metals and conductive inorganic oxides such as tungsten oxide or iridium oxide. These may be used singly or in combination. Particularly, it is preferred that carbon particles having large specific surface area are used singly, or that a mixture of carbon particles having large specific surface area and other electron conductive particles is used. That is, the catalyst layer for a direct-liquid fuel cell preferably contains the above catalyst and carbon particles having a large specific surface area.

Examples of the carbon include carbon black, graphite, activated carbon, carbon nanotube, carbon nanofiber, carbon nanohorn and fullerene. If the particle diameter of carbon is excessively small, an electron conductive path is not readily formed. If the particle diameter of carbon is excessively large, the catalyst layer for the fuel cell tends to have decreased gas diffusion properties or the catalyst utilization rate tends to be lowered, and therefore, the particle diameter of carbon is preferably 10 to 1000 nm, more preferably 10 to 100 nm.

In the present invention, the particle diameter of carbon is a value measured with a Transmission Electron Microscope (TEM).

When the material constituting the electron conductive particles is carbon, the mass ratio of the catalyst to carbon (catalyst:electron conductive particles) is preferably 0.5:1 to 1000:1, more preferably 1:1 to 100:1, more preferably 4:1 to 10:1.

The conductive polymers are not particularly limited, but examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline, and polythiophene are preferred, and polypyrrole is more preferred.

Polymer electrolytes are not particularly limited as long as being those commonly used in catalyst layers for direct-liquid fuel cells. Specific examples thereof include perfluorocarbon polymers having a sulfonic acid group (e.g., NAFION (registered trademark), DuPont, a 5% NAFION (registered trademark) solution (DE521)), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid solution. Of these, NAFION (registered trademark) (DuPont, a 5% NAFION (registered trademark) solution (DE521)) is preferable.

The above catalyst may be dispersed on the electron conductive particles serving as a carrier by methods such as airborne dispersion methods and in-liquid dispersion methods. The in-liquid dispersion methods are preferable because a dispersion of the catalyst and the electron conductive particles in a solvent can be used in the step for forming a catalyst layer for a direct-liquid fuel cell. Exemplary in-liquid dispersion methods include orifice-choked flow method, rotational shear flow method and ultrasonic method. The solvents used in the in-liquid dispersion methods are not particularly limited as long as the catalysts or the electron conductive particles are not corroded and are dispersed therein, but volatile liquid organic solvents, water or the like can be used.

When the catalyst is dispersed on the electron conductive particles, further, the above electrolyte and a dispersing agent may be dispersed at the same time.

The catalyst layer for a direct-liquid fuel cell may be formed by any methods without limitation. For example, a suspension containing the catalyst, the electron conductive particles and the electrolyte may be applied to an electrolyte membrane or a gas diffusion layer as described later. The application methods include dipping, screen printing, roll coating and spraying. In another embodiment, a suspension containing the catalyst, the electron conductive particles, and the electrolyte may be applied or filtered on a substrate to form a catalyst layer for a direct-liquid fuel cell, and the catalyst layer for a direct-liquid fuel cell may be transferred to an electrolyte membrane.

The electrode for a direct-liquid fuel cell of the present invention (hereinafter, also referred to simply as the "electrode") comprises the catalyst layer for a direct-liquid fuel cell and a porous support layer.

The porous support layer is a layer which diffuses gas (hereinafter also referred to as a "gas diffusion layer"). The gas diffusion layer is not limited as long as having electron conductivity, high gas diffusion properties, and high corrosion resistance. Carbon-based porous materials such as carbon paper and carbon cloth, and stainless steel and anticorrosive-coated aluminum foils for weight reduction are generally used as the gas diffusion layer.

<Membrane-Electrode Assembly for Direct-Liquid Fuel Cell>

The membrane-electrode assembly for a direct-liquid fuel cell of the present invention comprises a cathode, an anode, and an electrolyte membrane interposed between the cathode and the anode, wherein at least one of the cathode and the anode is the electrode described above. At this time, when only one of the cathode and the anode is the electrode described above, the other electrode may be a known electrode for a direct-liquid fuel cell, for example, an electrode for a direct-liquid fuel cell containing a platinum-based catalyst such as a platinum-supporting carbon, instead of the composite catalyst.

Hereinafter, in the specification of the present invention, the membrane-electrode assembly may be referred to as the "MEA".

The membrane-electrode assembly can be obtained by forming the electrode catalyst layer on an electrolyte membrane and/or on a gas diffusion layer, and then sandwiching both surfaces of the electrolyte membrane, with the catalyst layer positioned inward, by the gas diffusion layer. In the manufacturing of the membrane electrode assembly, the membrane-electrode assembly can be obtained by using a hot press. Alternatively, the membrane-electrode assembly can be obtained by sandwiching the electrode and the electrolyte membrane without using a hot press.

The hot press temperature in hot pressing is appropriately selected according to components in the electrolyte membrane and/or in the catalyst layer, but is preferably 100 to 160° C., more preferably 120 to 160° C., still more preferably 120 to 140° C. If the temperature in hot pressing is lower than the lower limit value, assembling may be insufficient. If the temperature in hot pressing is higher than the upper limit value, the components in the electrolyte membrane and/or in the catalyst layer may be deteriorated.

The hot pressing pressure is appropriately selected according to components in the electrolyte membrane and/or in the catalyst layer, and the type of gas diffusion layer, but is preferably 1 to 10 MPa, more preferably 1 to 6 MPa, still more preferably 2 to 5 MPa. If the hot pressing pressure is less than the lower limit value, assembling may be insufficient. If the hot pressing pressure is more than the upper limit value, the porosity of the catalyst layer and of the gas diffusion layer may be reduced, leading to deteriorated performance.

The hot pressing time is appropriately selected according to the temperature and the pressure in hot pressing, but is preferably 1 to 20 minutes, more preferably 3 to 20 minutes, still more preferably 5 to 20 minutes.

In the manufacturing of the membrane-electrode assembly, the disposition of a second electrode layer between the electrode and the electrolyte membrane, the second electrode layer differing from the electrode containing the electrode catalyst for a direct-liquid fuel cell of the present invention, is expected to allow the membrane-electrode assembly to have a higher durability. The component to be introduced to the second layer (hereinafter also referred to as the "second electrode layer component") is not particularly limited, but particularly preferred is a component that is flexible enough not to damage the electrolyte membrane and allows conductive paths of ions (for example, proton) and electrons to be easily formed. From this viewpoint, a conductive material such as a carbon material and a conductive polymer is preferable.

Preferred examples of the carbon material include carbon black, graphite, activated carbon, carbon nanotube, carbon nanofiber, carbon nanohorn, fullerene, porous carbon and graphene. Carbon black and graphite are more preferable.

The conductive polymer is not particularly limited but examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline, polyphenylquinoxaline and derivatives thereof. Of these, polypyrrole, polyaniline, and polythiophene are preferred, and polypyrrole is more preferred.

Particularly, by allowing the second electrode layer to be a layer in which protons readily move but methanol hardly moves, it is expected that the influence of methanol crossover is suppressed and catalytic performance is improved. In order to allow protons to easily move in the second electrode layer, it is preferable that the second electrode layer component is mixed with a material having proton conductivity. The proton conductive material is not particularly limited. Examples thereof include perfluorocarbon polymers having a sulfonic acid group, hydrocarbon polymer compounds having a sulfonic acid group, polymer compounds doped with inorganic acids such as a phosphoric acid, organic/inorganic hybrid polymers partially substituted with proton conductive functional groups, and proton conductors composed of a polymer matrix impregnated with a phosphoric acid solution or a sulfuric acid solution. Of these, a copolymer of tetrafluoroethylene and perfluoro[2-(fluorosulfonylethoxy)propylviny ether] (for example, NAFION (registered trademark)) is preferable.

A method for disposing the second electrode layer between the electrode and the electrolyte membrane is not particularly limited. For example, by using a bar coater, a spray or the like, the second electrode layer component may be directly applied on the surface of the electrode catalyst layer, or may be directly applied on the surface of the electrolyte membrane. The provision of the second electrode layer between the cathode catalyst layer and the electrolyte membrane, or between the anode catalyst layer and the electrolyte membrane, i.e., between the electrode and the electrolyte membrane, allows the above-mentioned advantageous effects to exhibit suitably. The provision of the second electrode layer between the cathode catalyst layer and the electrolyte membrane is further preferable.

The direct-liquid fuel cell of the present invention comprises the membrane-electrode assembly for a direct-liquid fuel cell.

The direct-liquid fuel cell of the present invention achieves less decrease in cathode potential caused by fuel crossover, has a long life, and is inexpensive because of no need for expensive noble metals such as platinum, and therefore is suited for portable devices such as personal computers and mobile phones, automobiles, or stationary fuel cell apparatuses.

EXAMPLES

The present invention will be described below in greater detail based on Examples but the present invention is not limited to these Examples.

In Examples and Comparative Examples, various measurements were performed by the following methods.
[Analytical Methods]
1. Powder X-Ray Diffractometry Samples were subjected to powder X-ray diffractometry using Rotaflex manufactured by Rigaku Corporation.

With regard to the counting of diffraction peaks in the powder X-ray diffractometry for each sample, a signal that was detected with a signal (S) to noise (N) ratio (S/N) of 2 or more was regarded as a single peak.

The noise (N) was the width of the baseline.
2. Element Analysis

Carbon: about 0.1 g of a sample was weighed and measured with EMIA-110 (HORIBA, Ltd.).

Nitrogen and Oxygen: about 0.1 g of a sample was weighed, was sealed in a Ni capsule, and was measured with an oxygen/nitrogen analyzer.

Transition Metal Element (e.g., titanium): about 0.1 g of a sample was weighed in a platinum plate, had an acid added thereto, and was thermally decomposed. The thermally-decomposed product was collected to a constant volume and diluted, and was quantitated by ICP-MS.
3. BET Specific Surface Area 0.15 g of a sample was collected and its specific surface area was measured with a full-automatic BET specific surface area measurement instrument Macsorb (manufactured by Mountec. Co., Ltd.). The pre-treatment time and the pre-treatment temperature were set at 30 minutes and 200° C., respectively.

Reference Example 1

Manufacturing of Anode Electrode for Single Cell Evaluation

1. Manufacturing of Anode Catalyst Ink 0.6 g of a Pt—Ru-supporting carbon (TEC61E54DM, manufactured by TANAKA KIKINZOKU KOGYO K.K.) was added to 50 ml of pure water. Further, 5 g of an aqueous solution containing a proton conductive material (NAFION (registered trademark); 0.25 g) (aqueous 5% NAFION solution, manufactured by Wako Pure Chemical Industries, Ltd.) was introduced. These were mixed for 1 hour with an ultrasonic dispersing machine (UT-106H, manufactured by Sharp Manufacturing Systems Corporation), to manufacture an anode catalyst ink (1).
2. Manufacturing of Electrode Having Anode Catalyst Layer A gas diffusion layer (carbon paper TGP-H-060, manufactured by Toray Industries, Inc.) (5 cm×5 cm (25 cm$^2$)) was immersed in acetone for 30 seconds for degreasing.

Subsequently, the surface of the gas diffusion layer was coated by using an automatic spray coating device (manufactured by SAN-EI TECH Ltd.) at 80° C. with the anode catalyst ink (1) manufactured in the above 1. As a result of a repeated spray coating such that the amount of the Pt—Ru-supporting carbon per unit area would be 1.0 mg/cm$^2$, followed by cutting into a square (5 cm²), an electrode having an anode catalyst layer (1) was manufactured.

Example 1

1. Production of Catalyst (TiFeCNO)

5 mL of titanium tetraisopropoxide (manufactured by Junsei Chemical Co., Ltd.) and 5 mL of acetylacetone (Junsei Chemical Co., Ltd.) were added to a solution of 15 mL of ethanol (manufactured by Wako Pure Chemical Industries, Ltd.) and 5 mL of acetic acid (manufactured by Wako Pure Chemical Industries, Ltd.), followed by stirring at room temperature, to prepare a titanium-containing mixture solution. Meanwhile, 2.507 g of glycine (manufactured by Wako Pure Chemical Industries, Ltd.) and 0.153 g of iron acetate (manufactured by Aldrich) were added to 20 mL of pure water, followed by stirring at room temperature until these components were completely dissolved, to prepare a glycine-containing mixture solution.

The titanium-containing mixture solution was added slowly to the glycine-containing mixture solution, to prepare a catalyst precursor composition. By using a rotary evaporator under reduced pressure in nitrogen atmosphere, with the temperature of a hot stirrer set at about 100° C., the catalyst precursor composition was heated and stirred to slowly evaporate the solvent. After the solvent of the catalyst precursor composition was fully evaporated, the residue was finely and uniformly crushed with a mortar, to obtain a powder.

This powder was introduced to a tubular furnace, and heated to 900° C. at a heating rate of 10° C./min under a mixed gas atmosphere of hydrogen at 4% by volume and nitrogen, and retained at 900° C. for 1 hour, and thereafter was allowed to cool. Thereby, a powder (hereinafter also referred to as the "catalyst (1)" or the "heat-treated product (1)") was obtained.

Figure 1:
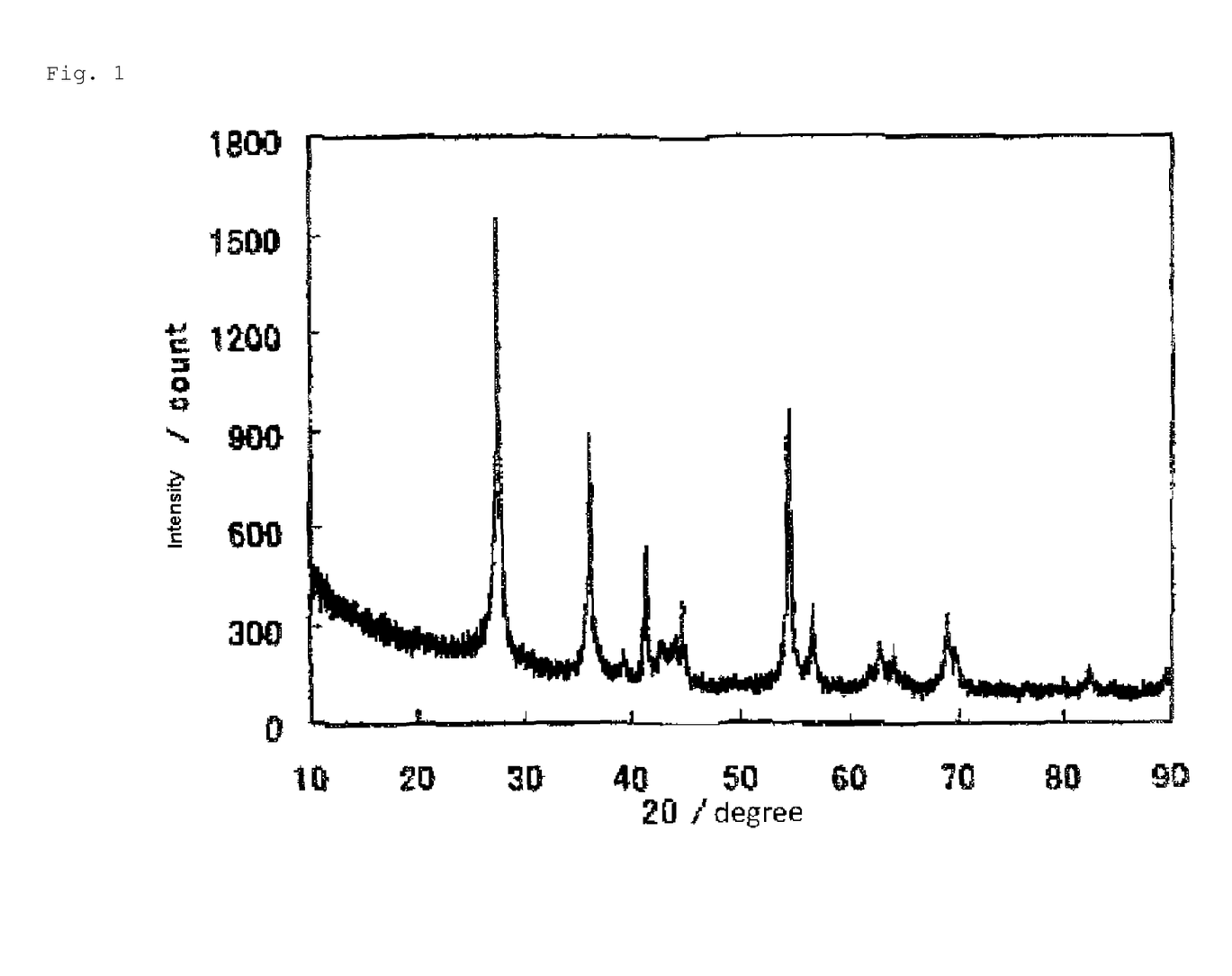
FIG. 1 shows the powder X-ray diffraction spectrum of a catalyst (1) obtained in Example 1.

The powder X-ray diffraction spectrum of the catalyst (1) is shown in FIG. 1. Diffraction peaks of a titanium compound having a cubic crystal structure and of titanium oxide having a rutile structure were observed.

The component proportion of the catalyst (1) based on the result of elemental analysis is shown in Table 1. The presence of carbon, nitrogen and oxygen was confirmed. The catalyst (1) had a BET specific surface area of 172 m²/g.

2. Manufacturing of Cathode Catalyst Ink

To a mixed solvent of 25 ml of isopropyl alcohol (manufactured by Wako Pure Chemical Industries, Ltd.) and 25 ml of ion exchange water, 0.355 g of the catalyst (1) and 0.089 g of carbon black as an electron conductive material (ketjen black EC300J, manufactured by Lion Corporation) were added. Further, 5.325 g of an aqueous 5% Nafion (NAFION (registered trademark) solution (manufactured by Wako Pure Chemical Industries, Ltd.) was added as a proton conductive material. These were mixed with an ultrasonic dispersing machine (UT-106H, manufactured by Sharp Manufacturing Systems Corporation) for 1 hour, to manufacture a cathode catalyst ink (1).

3. Manufacturing of Electrode Having Cathode Catalyst Layer

The surface of the gas diffusion layer (carbon paper (GDL24BC, manufactured by SGL Carbon Group)) (hereinafter also referred to as the "GDL") (5 cm×5 cm (25 cm²)) was coated by using an automatic spray coating device (manufactured by SAN-EI TECH Ltd.) at 80° C. with the cathode catalyst ink (1), followed by cutting to a square (5 cm²). An electrode (1) in which a cathode catalyst layer was present on the GDL surface (hereinafter also referred to as the "cathode (1)") was thus manufactured. The catalyst ink was applied such that the application amount of the catalyst (1) would be 4.0 mg per 1 cm² of the electrode.

4. Manufacturing of Membrane-Electrode Assembly for Fuel Cell

A Nafion (NAFION (registered trademark) membrane (N-212, manufactured by DuPont) as an electrolyte membrane, the cathode (1) as a cathode, and the electrode having an anode catalyst layer (1) manufactured in Reference Example 1 (hereinafter also referred to as the "anode (1)") as an anode were prepared. A membrane-electrode assembly for a fuel cell (1) (hereinafter also referred to as the "MEA (1)") in which the electrolyte membrane was interposed between the cathode and the anode was manufactured in the following manner.

In such a way that the electrolyte membrane would be held by the cathode (1) and by the anode (1) and the cathode catalyst layer and the anode catalyst layer would adhere to the electrolyte membrane, a single cell (1) (hereinafter also referred to as the "single cell (1)") (cell area: 5 cm²) was manufactured.

5. Evaluation of Single Cell

The single cell (1) was adjusted to a temperature of 60° C. The anode was supplied with an aqueous solution of methanol with a different concentration, i.e., 1 mol/dm³ or 5 mol/dm³, at a flow amount of 3 ml/min. To compare the influence of methanol crossover, the anode was supplied with hydrogen, instead of methanol, as a fuel at a rate of 100 ml/min. The cathode was supplied with oxygen as an oxidizing agent at a flow amount of 100 ml/min. Under the environment of ordinary pressure, the onset voltage of the single cell (1) at each methanol concentration was measured to evaluate the influence of methanol crossover. Results thereof are shown in Table 1.

Example 2

1. Manufacturing of Second Electrode Layer Component Ink

To a mixed solvent of 25 ml of isopropyl alcohol (manufactured by Wako Pure Chemical Industries, Ltd.) and 25 ml of ion exchange water, 0.444 g of carbon black (ketjen black EC300J, manufactured by Lion Corporation) and 5.325 g of an aqueous 5% Nafion (NAFION (registered trademark) solution (manufactured by Wako Pure Chemical Industries, Ltd.) as a proton conductive material were added. These were mixed with an ultrasonic dispersing machine (UT-106H, manufactured by Sharp Manufacturing Systems Corporation) for 1 hour, to manufacture a second electrode layer component ink (2).

2. Manufacturing of Electrode Having Second Electrode Layer

In the same manner as in Example 1, the surface of the gas diffusion layer (GDL) was coated with the cathode catalyst ink (1) to prepare a cathode formed from the cathode catalyst ink (1). The surface of the cathode was coated by using an automatic spray coating device (manufactured by SAN-EI TECH Ltd.) at 80° C. with the second electrode layer component ink (2), followed by cutting into a square (5 cm²), to manufacture an electrode (2) (hereinafter also referred to as the "cathode (2)") in which the second electrode layer was present on the surface of the cathode catalyst layer. The second electrode layer ink was applied such that the application amount of the carbon black as the second electrode layer component would be 1.0 mg per 1 cm² of the electrode.

3. Manufacturing of Membrane-Electrode Assembly for Fuel Cell

A Nafion (NAFION (registered trademark)) membrane (N-212, manufactured by DuPont) as an electrolyte membrane, the cathode (2) as a cathode, and the electrode having an anode catalyst layer (1) manufactured in Reference Example 1 (hereinafter also referred to as the "anode (1)") as an anode were prepared. A membrane-electrode assembly for a fuel cell (2) (hereinafter also referred to as the "MEA (2)") in which the electrolyte membrane was interposed between the cathode (2) and the anode (1) was manufactured in the following manner.

In such a way that the electrolyte membrane would be held by the cathode (2) and by the anode (1) and the cathode catalyst layer and the anode catalyst layer would adhere to the electrolyte membrane, a single cell (2) hereinafter also referred to as the "single cell (2)") (cell area: 5 cm²) was manufactured.

4. Evaluation of Single Cell

Figure 2:
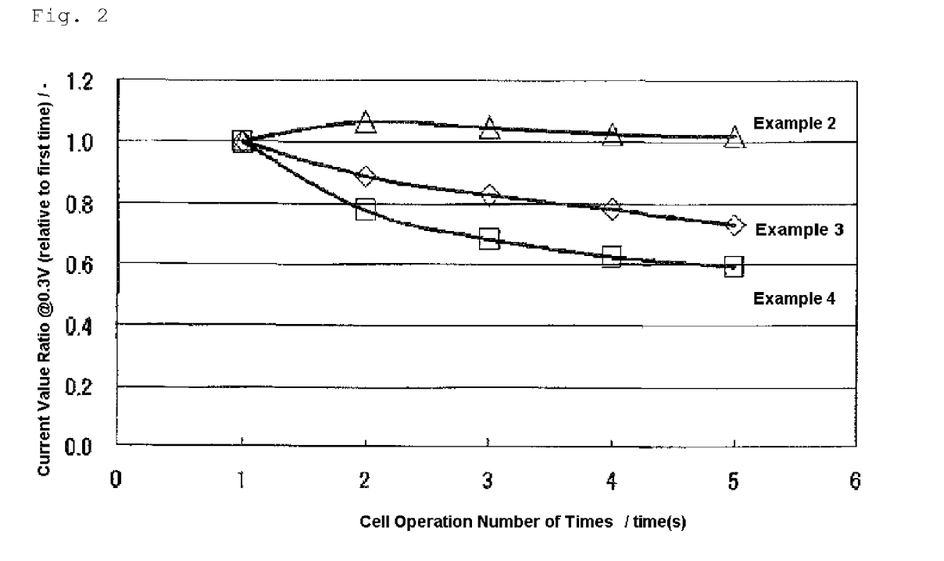
FIG. 2 shows current value ratios obtained in Examples 2 to 4.

The single cell (2) was adjusted to 60° C. The anode was supplied with 5 mol/dm³ of methanol at a rate of 3 ml/min. The cathode was supplied with oxygen as an oxidizing agent at a flow amount of 100 ml/min. Under the environment of ordinary pressure, a current-voltage property in the single cell was measured. From the obtained current-voltage property curve, the relation between a ratio of a current value at the cell operation number of times relative to an initial current density, at 0.30 V, and the cell operation number of times, is shown in FIG. 2. The single cell (2) having the second electrode layer exhibited higher initial durability than the single cell (5) having no second electrode layer of Example 4.

Example 3

1. Manufacturing of Second Electrode Layer Component Ink

To a mixed solvent of 25 ml of isopropyl alcohol (manufactured by Wako Pure Chemical Industries, Ltd.) and 25 ml of ion exchange water, 0.444 g of carbon black (ketjen black EC300J, Lion Corporation) and 5.325 g of an aqueous 5% Nafion (NAFION (registered trademark) solution (manufactured by Wako Pure Chemical Industries, Ltd.) as a proton conductive material were added. These were mixed for 1 hour with an ultrasonic dispersing machine (UT-106H, manufactured by Sharp Manufacturing Systems Corporation), to manufacture a second electrode layer component ink (3).

2. Manufacturing of Electrolyte Membrane Having Second Electrode Layer

The surface of a Nafion (NAFION (registered trademark)) membrane (N-212, manufactured by DuPont), which was an electrolyte membrane (5 cm×5 cm (25 cm²)), was coated by using an automatic spray coating device (manufactured by SAN-EI TECH Ltd.) at 80° C. with the second electrode layer component ink (3), followed by cutting into a square (5 cm²), to manufacture a membrane in which the second electrode layer was present on the surface of the electrolyte membrane. The second electrode layer ink was applied such that the application amount of the carbon black as the second electrode layer component would be 1.0 mg of per 1 cm² of the electrolyte membrane.

3. Manufacturing of Membrane-Electrode Assembly for Fuel Cell

A cathode (3) manufactured in the same manner as in Example 1 as a cathode, and the electrode having an anode catalyst layer (1) manufactured in Reference Example 1 (hereinafter also referred to as the "anode (1)") as an anode were prepared. A membrane-electrode assembly for a fuel cell (3) (hereinafter also referred to as the "MEA (3)") in which the cathode (3) was disposed on the surface having the second electrode layer of the electrolyte membrane with the second electrode layer, and the anode (1) was disposed on the surface not having the second electrode layer of the electrolyte membrane with the second electrode layer was manufactured in the following manner.

In such a way that the electrolyte membrane would be held by the cathode (3) and by the anode (1), and the cathode catalyst layer and the anode catalyst layer would adhere to the electrolyte membrane, a single cell (3) hereinafter also referred to as the "single cell (3)") (cell area: 5 cm²) was manufactured.

4. Evaluation of Single Cell

The single cell (3) was adjusted to 60° C. The anode was supplied with 5 mol/dm³ of methanol at a rate of 3 ml/min. The cathode was supplied with oxygen as an oxidizing agent at a flow amount of 100 ml/min. Under the environment of ordinary pressure, a current-voltage property in the single cell was measured. From the obtained current-voltage property curve, the relation between a ratio of a current value at the cell operation number of times relative to an initial current density, at 0.30 V, and the cell operation number of times, is shown in FIG. 2. The single cell (3) having the second electrode layer exhibited higher initial durability than the single cell (5) having no second electrode layer of Example 4.

Example 4

1. Manufacturing of Membrane-Electrode Assembly for Fuel Cell

In the same manner as in Example 1, a Nafion (NAFION (registered trademark)) membrane (N-212, manufactured by DuPont) as an electrolyte membrane, the cathode (1) as a cathode, and the electrode having an anode catalyst layer (1) manufactured in Reference Example 1 (hereinafter also referred to as the "anode (1)") as an anode were prepared. A membrane-electrode assembly for a fuel cell (5) (hereinafter also referred to as the "MEA (5)") in which the electrolyte membrane was interposed between the cathode (1) and the anode (1) was manufactured in the following manner.

In such a way that the electrolyte membrane would be held by the cathode (1) and by the anode (1), and the cathode catalyst layer and the anode catalyst layer would adhere to the electrolyte membrane, a single cell (5) (hereinafter also referred to as the "single cell (5)") (cell area: 5 cm²) was manufactured.

2. Evaluation of Single Cell

The single cell (5) was adjusted to 60° C. The anode was supplied with 5 mol/dm$^3$ of methanol at a rate of 3 ml/min. The cathode was supplied with oxygen as an oxidizing agent at a flow amount of 100 ml/min. Under the environment of ordinary pressure, a current-voltage property in the single cell was measured. From the obtained current-voltage property curve, the relation between a ratio of a current value at the cell operation number of times relative to an initial current density, at 0.30 V, and the cell operation number of times, is shown in FIG. 2.

Comparative Example 1

1. Manufacturing of Cathode Catalyst (Pt/C) Ink 0.6 g of a Pt-supporting carbon (TEC10E70TPM, manufactured by TANAKA KIKINZOKU KOGYO K.K.) was added to 50 ml of pure water. Further, 5 g of an aqueous solution containing a proton conductive material (NAFION (registered trademark); 0.25 g) (NAFION 5% aqueous solution, manufactured by Wako Pure Chemical Industries, Ltd.) was introduced. These were mixed with an ultrasonic dispersing machine (UT-106H, manufactured by Sharp Manufacturing Systems Corporation) for 1 hour, to manufacture a cathode catalyst ink (4).

2. Manufacturing of Electrode Having Cathode Catalyst Layer

A gas diffusion layer (carbon paper TGP-H-060, manufactured by Toray Industries, Inc.) (5 cm×5 cm (25 cm$^2$)) was immersed in acetone for 30 seconds for degreasing.

Subsequently, the surface of the gas diffusion layer was coated by using an automatic spray coating device (manufactured by SAN-EI TECH Ltd.) at 80° C. with the cathode catalyst ink (4) manufactured in the above 1, followed by cutting into a square (5 cm$^2$). An electrode having a cathode catalyst layer (4) was thus manufactured. The coating was a repeated spray coating conducted such that the amount of the Pt-supporting carbon per unit area would be 1.0 mg/cm$^2$.

3. Manufacturing of Membrane-Electrode Assembly for Fuel Cell

A Nafion (NAFION (registered trademark)) membrane (N-212, manufactured by DuPont) as an electrolyte membrane, the cathode (4) as a cathode, and the anode (1) manufactured in Reference Example 1 as an anode were prepared. A membrane-electrode assembly for a fuel cell (4) (hereinafter also referred to as the "MEA (4)") in which the electrolyte membrane was interposed was between the cathode and the anode was manufactured in the following manner.

In such a way that the electrolyte membrane would be held by the cathode (4) and by the anode (1), and the cathode catalyst layer and the anode catalyst layer would adhere to the electrolyte membrane, a single cell (4) hereinafter also referred to as the "single cell (4)") (cell area: 5 cm$^2$) was manufactured.

4. Evaluation of Single Cell

The single cell (3) was adjusted to a temperature of 60° C. The anode was supplied with an aqueous solution of methanol with a concentration of 1 mol/dm$^3$ or 5 mol/dm$^3$, at a flow amount of 3 ml/min. To compare the influence of methanol crossover, the anode was supplied with hydrogen as a fuel at a rate of 100 ml/min instead of methanol. The cathode was supplied with oxygen as an oxidizing agent at a flow amount of 100 ml/min. Under the environment of ordinary pressure, the onset voltage of the single cell (3) at each methanol concentration was measured to evaluate the influence of methanol crossover. Results thereof are shown in Table 1.

TABLE 1

Comparison of Onset Voltages of Single Cells Using Different Catalyst as Measured in Each Methanol Concentration

| | Anode Catalyst | Cathode Catalyst | Fuel (Hydrogen or Methanol) | Onset Voltage of Cell |
|---|---|---|---|---|
| Example 1 | Pt—Ru/C | $Ti_{0.95}Fe_{0.05}C_{1.51}N_{0.15}O_{1.55}$ | Hydrogen (99.99%) | 900 mV |
| | | | MeOH 1 mol/dm$^3$ | 641 mV |
| | | | MeOH 5 mol/dm$^3$ | 559 mV |
| Comparative Example 1 | Pt—Ru/C | Pt/C | Hydrogen (99.99%) | 970 mV |
| | | | MeOH 1 mol/dm$^3$ | 602 mV |
| | | | MeOH 5 mol/dm$^3$ | 520 mV |

The invention claimed is:

1. A process for producing an electrode catalyst for a direct-liquid fuel cell comprising:
   Step A of mixing at least a transition metal-containing compound with a nitrogen-containing organic compound to obtain a catalyst precursor composition, and
   Step C of heat-treating the catalyst precursor composition at a temperature of from 500 to 1100° C. to obtain an electrode catalyst, wherein
   part or entirety of the transition metal-containing compound comprises, as a transition metal element, at least one transition metal element M1 selected from Group IV and Group V elements of the periodic table, wherein
   the nitrogen-containing organic compound comprises a carbonyl group, wherein
   to an α-carbon of the carbonyl group, a nitrogen atom is bonded.

2. The process for producing an electrode catalyst for a direct-liquid fuel cell according to claim 1, wherein in Step A, the mixing is performed in a solvent.

3. The process for producing an electrode catalyst for a direct-liquid fuel cell according to claim 2, which comprises, between Step A and Step C, Step B of removing the solvent from the catalyst precursor composition.

4. The process for producing an electrode catalyst for a direct-liquid fuel cell according to claim 2, wherein at least one of the transition metal-containing compound and the nitrogen-containing organic compound and the solvent comprises oxygen in the molecule.

5. The process for producing an electrode catalyst for a direct-liquid fuel cell according to claim 1, wherein the transition metal element M1 comprises at least one selected from titanium, zirconium, niobium and tantalum.

6. The process for producing an electrode catalyst for a direct-liquid fuel cell according to claim 1, wherein in Step A, a solution of the transition metal-containing compound is mixed with a solution of the nitrogen-containing organic compound.

7. The process for producing an electrode catalyst for a direct-liquid fuel cell according to claim 1, wherein the nitrogen-containing organic compound is a compound capable of forming a chelate together with a transition metal in the transition metal-containing compound.

8. The process for producing an electrode catalyst for a direct-liquid fuel cell according to claim 1, wherein in Step A, a compound having a diketone structure is further mixed.

9. The process for producing an electrode catalyst for a direct-liquid fuel cell according to claim 1, wherein the transition metal-containing compound partly comprises, as a transition metal element, at least one transition metal element M2 selected from iron, nickel, chromium, cobalt, vanadium and manganese.

10. The process for producing an electrode catalyst for a direct-liquid fuel cell according to claim 1, wherein the transition metal-containing compound is at least selected from the group consisting of metal nitrates, metal acid chlorides, metal-containing organic compounds, metal halides, metal perchlorates and metal hypochlorites.

11. The process for producing an electrode catalyst for a direct-liquid fuel cell according to claim 1, wherein in Step C, the catalyst precursor composition is heat-treated in an atmosphere containing 0.01 to 10 vol % of a hydrogen gas.

12. The process for producing an electrode catalyst for a direct-liquid fuel cell according to claim 1, wherein Step C is a step in which the catalyst precursor composition is heat-treated at a temperature of from 500 to 1100° C. and the obtained heat-treated product is disintegrated to obtain an electrode catalyst.

* * * * *